Patented Mar. 17, 1936

2,034,305

UNITED STATES PATENT OFFICE 2,034,305

AZO DYESTUFFS AND THEIR PRODUCTION

Max Albert Kunz, Mannheim, and Hans Krzikalla and Walter Limbacher, Ludwigshafen-on-the-Rhine, Germany, assignors to General Aniline Works, Inc., New York, N. Y., a corporation of Delaware No Drawing. Application March 9, 1934, Serial No. 714,886. In Germany March 18, 1933

10 Claims. (Cl. 260—12)

The present invention relates to valuable azo dyestuffs and a process of producing same.

We have found that valuable azo dyestuffs are obtained by coupling an 8-hydroxyquinaldine with a diazotized amino compound of the benzene series. Suitable 8-hydroxyquinaldines are 8-hydroxyquinaldine itself and its derivatives, such as 5-methyl-8-hydroxyquinaldine, 5-chlor-8-hydroxyquinaldine, 8-hydroxyquinophthalone (obtainable by melting 8-hydroxyquinaldine with phthalic anhydride at about 170° C.) and 8-hydroxyquinaldine-5-sulphonic acid.

The azo dyestuffs thus prepared are capable of employment for a great variety of purposes; those which contain no sulphonic acid groups may be employed for example as pigment coloring matters and for dyeing artificial silk and lacquers. They may also be produced on textile fibres in the manner usual with development dyestuffs. Dyestuffs of the kind defined containing sulphonic groups may be employed as direct cotton dyestuffs, acid wool dyestuffs and as after-chroming dyestuffs and in some cases for the conversion into lakes. They may also be dyed according to the so-called single bath chroming process. Quite a number of the dyestuffs thus obtainable may be converted in substance into complex metal compounds.

Suitable diazo compounds are those derived from the amino compounds of benzene and substituted benzenes, for example from plain, nitrated, halogenated, sulphonated, hydroxylated and alkoxylated aniline or homologues thereof; benzidine which is an aniline containing an aminophenyl radicle may also be used and valuable tetrazo compounds may be produced therewith by coupling the tetrazotized benzidine (or its derivatives such as tolidine) with coupling components at least one of which is an 8-hydroxyquinaldine.

8-hydroxyquinaldine and its derivatives may be prepared for example according to the method described in application Ser. No. 622,570, filed July 14th, 1932.

The following examples will further illustrate the nature of this invention but the invention is not restricted to these examples. The parts are by weight.

Example 1

9.3 parts of aniline are diazotized and the resulting solution is added to an aqueous solution of 17.4 parts of 8-hydroxyquinaldine rendered alkaline with sodium carbonate. A dyestuff is obtained which dyes acetate silk yellow-orange shades and is suitable for coloring varnish lacquers.

Example 2

The diazo compound obtained from 13.8 parts of para-nitraniline is coupled with an aqueous solution of 17.4 parts of 8-hydroxyquinaldine which has been rendered alkaline with sodium carbonate. The resulting dyestuff dyes acetate silk red-orange shades of very good fastness properties. The dyestuff is also suitable for coloring cellulose ester lacquers.

Example 3

12.3 parts of 1-methoxy-2-aminobenzene are diazotized and the resulting solution of the diazo compound added to a solution of 17.4 parts of 8-hydroxyquinaldine rendered alkaline with sodium carbonate. A dyestuff is obtained which dyes acetate silk orange shades of very good fastness to washing and which is suitable for coloring varnish lacquers.

Example 4

25.3 parts of 1-aminobenzene-3,6-disulphonic acid are diazotized and the resulting diazo solution is allowed to flow into a solution of 31.7 parts of 8-hydroxyquinophthalone (corresponding to the formula

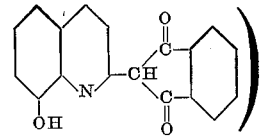

in caustic alkalies or pyridine containing an excess of sodium carbonate. The dyestuff yields reddish orange dyeings on wool which become fast and orange by treatment with bichromate. The same shades are obtained by dyeing on chrome-mordanted wool.

Example 5

The diazo compound prepared from 22.3 parts of 1-hydroxy-2-amino-4-chlorbenzene-6-sulphonic acid is coupled with a solution of 17.4 parts of 8-hydroxyquinaldine rendered alkaline with sodium carbonate. A dyestuff is obtained which dyes wool yellowish-brown shades; by after treatment with bichromate or by dyeing on chrome-mordanted wool, fast brown dyeings are obtained.

Example 6

20.7 parts of 1-amino-3-chlorbenzene-6-sulphonic acid are diazotized in the usual manner and the resulting solution of the diazo compound is allowed to flow into a solution of 17.4 parts of 8-hydroxyquinaldine rendered acid with hydrochloric acid. Coupling is carried to completion by the addition of an excess of sodium acetate. A dyestuff is obtained which dyes wool orange shades; by after treatment of the dyeing with bichromate or by dyeing on chrome-mordanted wool the shade of the dyeing is scarcely altered. If the dyestuff be boiled with a solution of chromium formate, a dyestuff is obtained which dyes wool or leather red-orange shades.

If 1-amino-2-chlorbenzene-5-sulphonic acid or 1-amino-4-chlorbenzene-3-sulphonic acid or 1-amino-4-chlorbenzene-2-sulphonic acid are used as coupling components dyestuffs of similar shades are obtained.

*Example 7*

The diazo compound prepared from 16.1 parts of 1-amino-2,5-dichlorbenzene is coupled with 26.2 parts of 8-hydroxyquinaldine-5-sulphonic acid dissolved in a solution of sodium carbonate. A dyestuff is obtained which dyes wool yellow-red shades; by aftertreatment of the dyeing with bichromate or by dyeing on chrome-mordanted wool, a fast orange dyeing is obtained.

*Example 8*

The diazo compound obtained from 22.9 parts of 2-nitro-4,4'-diaminodiphenyl is coupled with 52.4 parts of 8-hydroxyquinaldine-5-sulphonic acid dissolved in a solution of sodium carbonate. A dyestuff is obtained which yields bluish-red dyeings on wool; by aftertreatment of the dyeings with bichromate, fast red-orange shades are obtained. Similar shades are obtained by dyeing on chrome-mordanted wool.

The dyestuff dyes cotton bluish-red shades which become orange by aftertreatment with copper sulphate.

What we claim is:—

1. The process of producing azo dyestuffs which comprises coupling a diazotized amino compound of the benzene series with an 8-hydroxyquinaldine.

2. The process of producing azo dyestuffs which comprises coupling a diazotized amino compound of the benzene series with 8-hydroxyquinaldine.

3. The process of producing azo dyestuffs which comprises coupling a diazotized amino compound of the benzene series with an 8-hydroxyquinaldine and reacting the dyestuff formed with an agent supplying chromium.

4. The process of producing azo dyestuffs which comprises coupling a diazotized amino compound of the benzene series with an 8-hydroxyquinaldine and reacting the dyestuff formed with an agent supplying chromium.

5. Azo dyestuffs containing an 8-hydroxyquinaldine as a coupling component.

6. Azo dyestuffs containing 8-hydroxyquinaldine as a coupling component.

7. Complex chromium compounds of azo dyestuffs containing an 8-hydroxyquinaldine as a coupling component.

8. Complex chromium compounds of azo dyestuffs containing an 8-hydroxyquinaldine as a coupling component.

9. The azo dyestuff corresponding to the formula.

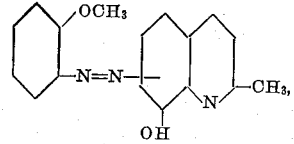

wherein the azo group is probably attached to the 5-position of the quinaldine.

10. The azo dyestuff corresponding to the formula

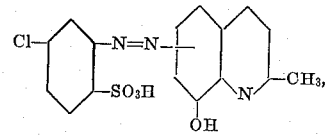

wherein the azo group is probably attached to the 5-position of the quinaldine.

MAX ALBERT KUNZ.
HANS KRZIKALLA.
WALTER LIMBACHER.